Figure 3:
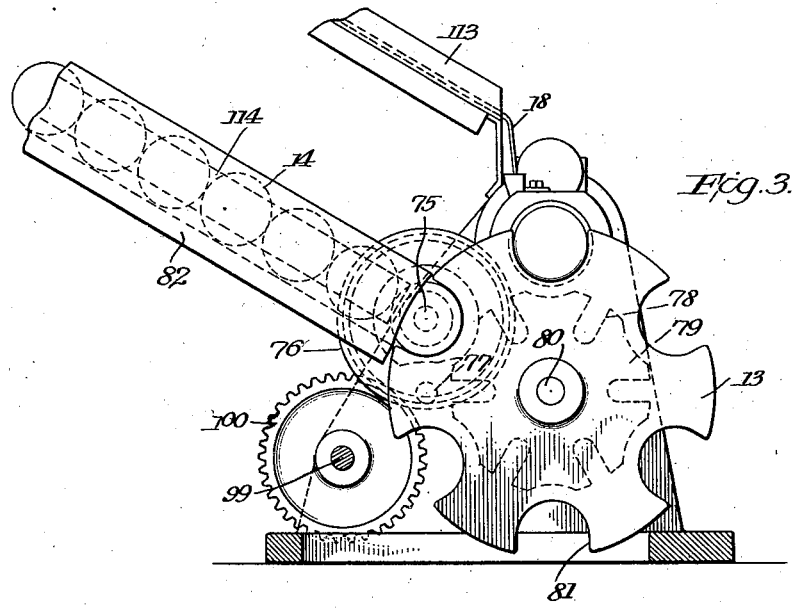

April 5, 1938.  G. GOEBEL  2,113,111
MACHINE FOR MAKING AND APPLYING PLASTIC GASKETS
Filed April 12, 1935  4 Sheets-Sheet 1
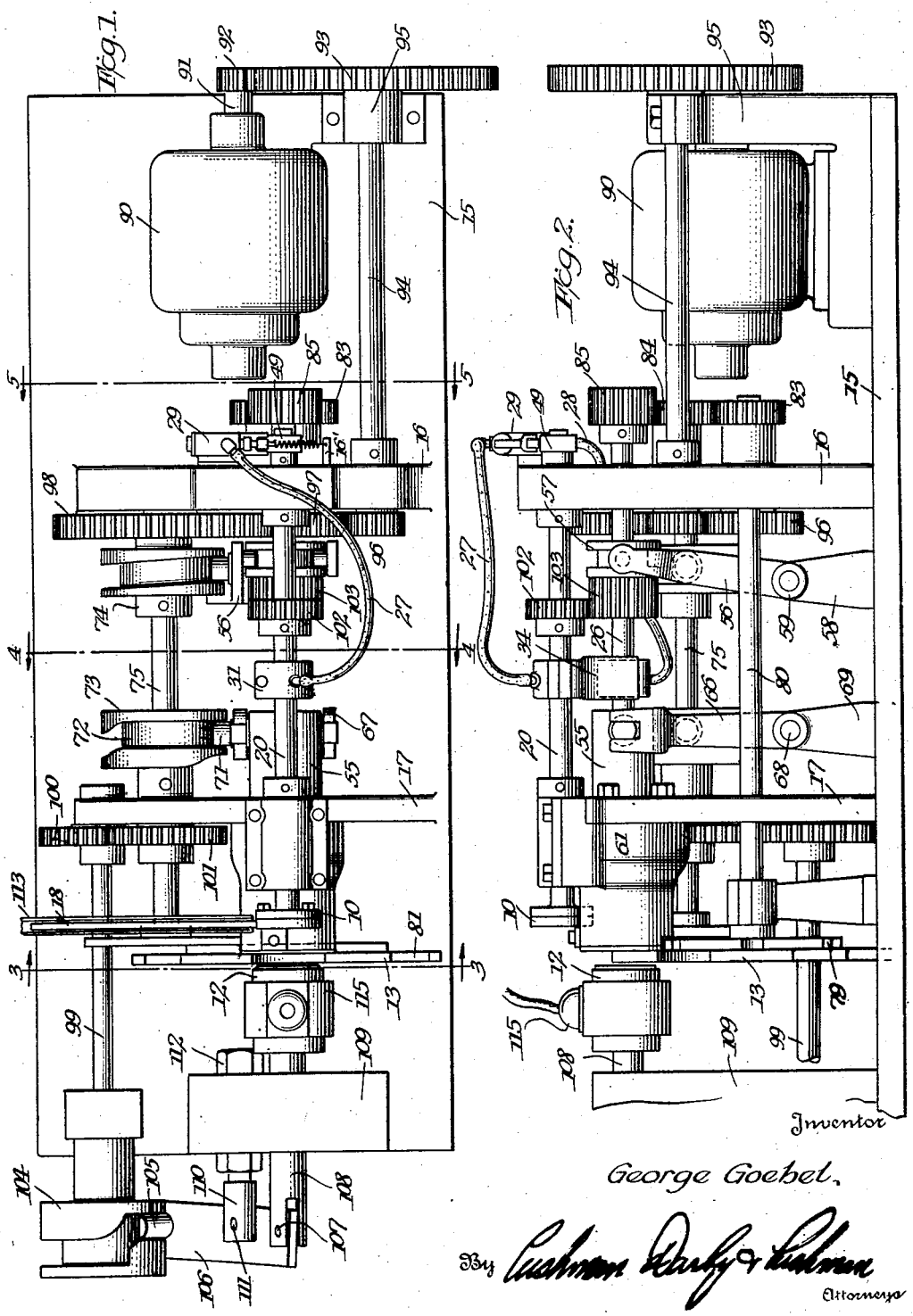
Inventor
George Goebel,
By Cushman Darby & Cushman
Attorneys April 5, 1938.　　　　　　G. GOEBEL　　　　　　2,113,111
MACHINE FOR MAKING AND APPLYING PLASTIC GASKETS
Filed April 12, 1935　　　4 Sheets-Sheet 2

Inventor

George Goebel

By Cushman Darby & Cushman
Attorneys

April 5, 1938. G. GOEBEL 2,113,111
MACHINE FOR MAKING AND APPLYING PLASTIC GASKETS
Filed April 12, 1935 4 Sheets-Sheet 3
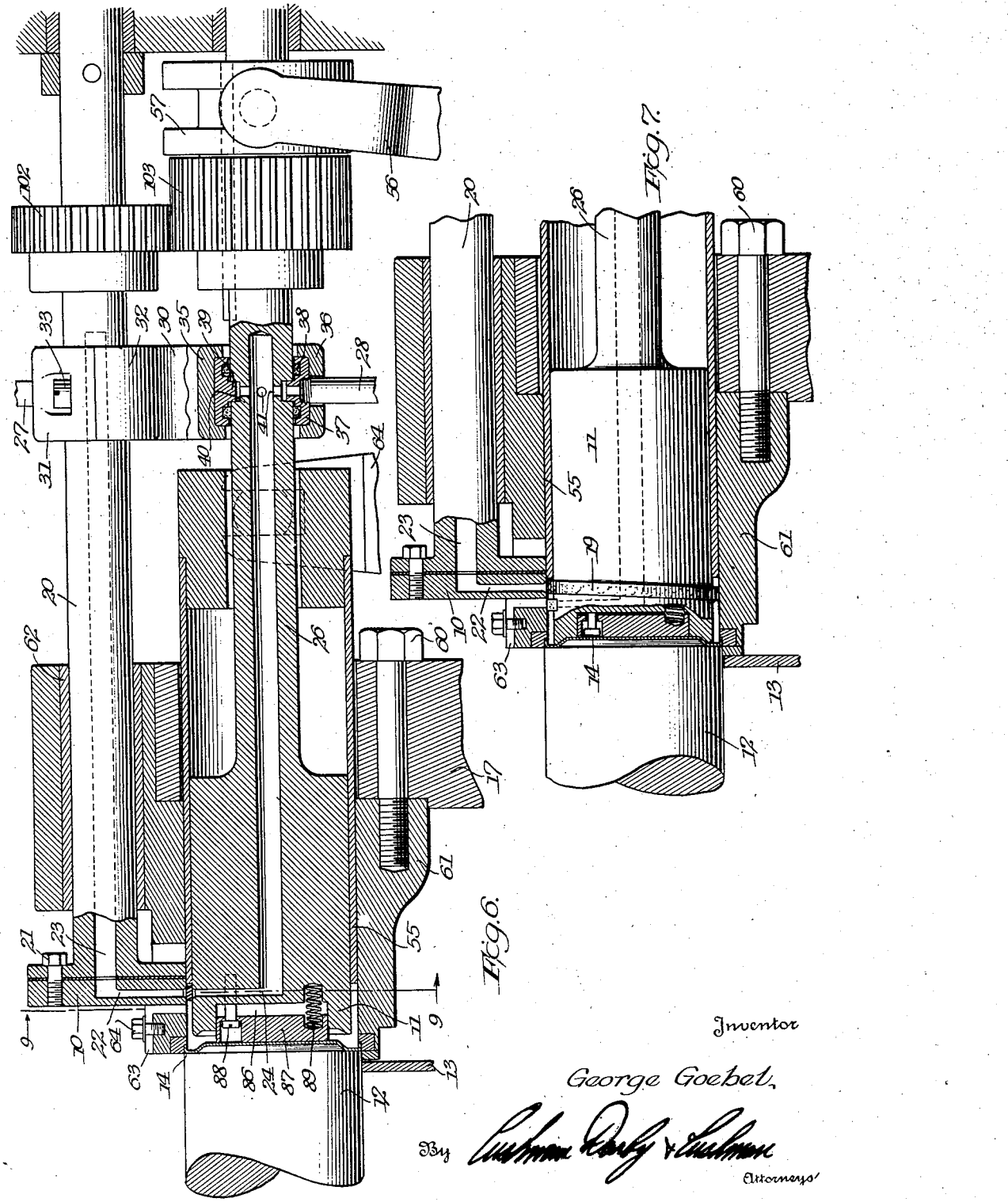
Inventor
George Goebel,
By
Attorneys April 5, 1938.    G. GOEBEL    2,113,111
MACHINE FOR MAKING AND APPLYING PLASTIC GASKETS
Filed April 12, 1935    4 Sheets-Sheet 4
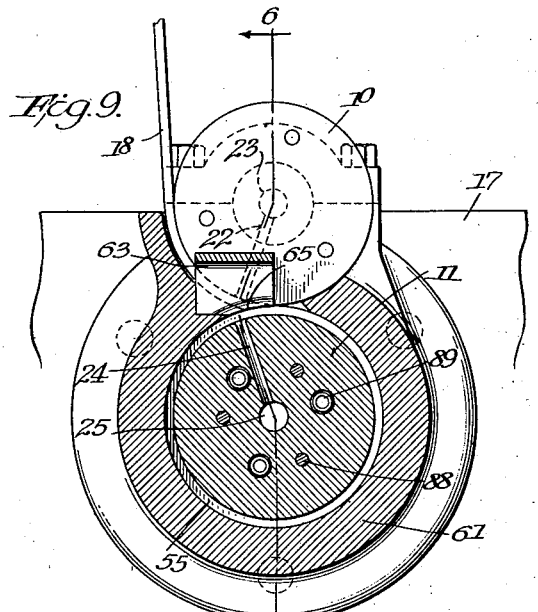
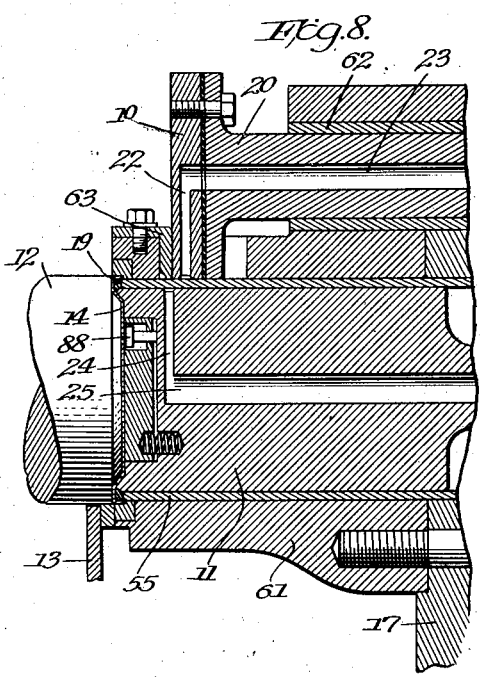
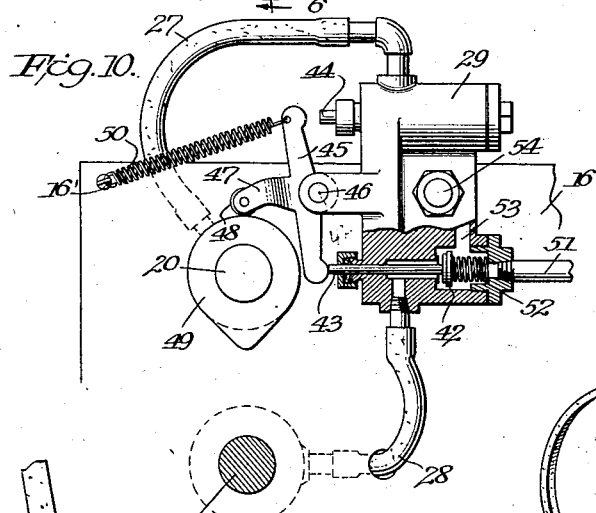
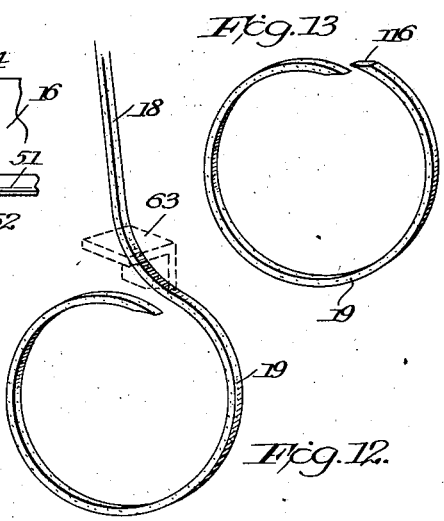
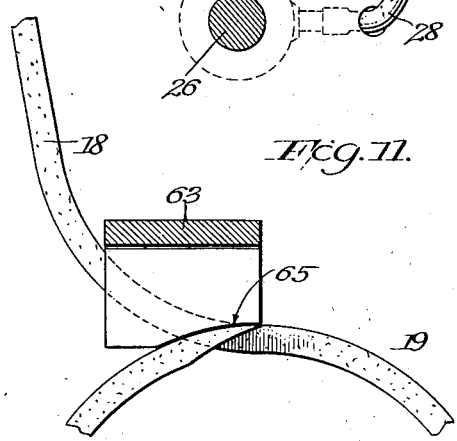
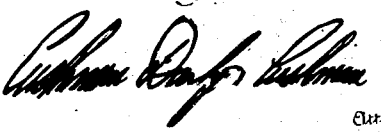
Inventor
George Goebel

Patented Apr. 5, 1938

2,113,111

UNITED STATES PATENT OFFICE

2,113,111

MACHINE FOR MAKING AND APPLYING PLASTIC GASKETS

George Goebel, Baltimore, Md., assignor to Crown Cork & Seal Company, Inc., Baltimore, Md., a corporation of New York Application April 12, 1935, Serial No. 16,083

17 Claims. (Cl. 113—80)

The present invention relates to a gasket or seal forming and applying machine and more particularly to improved means for releasably maintaining a strand of sealing or gasket material firmly against a feeding member and a forming member at predetermined intervals during the operation of the machine.

In the patent to Parks, No. 1,899,524, filed February 28, 1933, there is described a method of forming a gasket or similar article which involves the feeding of a strand lengthwise, and the winding of the same about a mandrel to substantially the configuration desired. Thereafter the preformed gasket is severed and automatically applied to the article, such as a closure in which it is to be used. The present invention relates to a machine for practicing such a method, and has, as a particular object, the provision of a machine which is an improvement upon the machine disclosed in the patent to Parks, Reissue No. 19,460, February 12, 1935. In the last mentioned patent, there is disclosed an apparatus for practicing this method. This apparatus includes movable technical means in the form of clamping members or fingers to hold the strand of material at predetermined intervals during the feeding and shaping operations. I have found that such mechanical means not only necessitates the use of a number of additional complicated parts, which increase the constructing and operating costs of the machine, but also require constant observation to see that these parts are immediately replaced or repaired when they become defective.

An object of the present invention is to provide a simplified construction which eliminates a number of the mechanical parts which are used in a machine of the character described in the aforesaid Reissue patent of Parks, No. 19,460, February 12, 1935, preferably by utilizing, to a large extent, pneumatic means for intermittently holding the strand during the forming and applying operation. This pneumatic means preferably takes the form of a suction, which may be disposed within the mandrel or device upon which the strand is formed, the suction being intermittently applied and released by automatic mechanism.

In order to simplify and improve the efficiency of machines for forming gaskets and the like, I associate with the feeding and forming members of the machine, pneumatic means for releasably maintaining a strand of plastic gasket material against each of these members. This means which includes the use of suction means has operatively associated therewith a valve, preferably operable by the machine, for alternately releasing suction applied to the feeding and forming members so that the strand of gasket material as it issues from a reel or extrusion head, is initially held against the feeding member until the strand is presented to the forming member, whereupon the suction is released on the feeding member and applied to the forming member to hold the strand as it is wrapped around the forming member.

A further object consists in the provision of means for spirally wrapping a strand around the forming member to permit a slight overlap at the ends of the strand so that when the gasket is formed and applied to the jar or container cap, its overlapped ends will be united to provide a continuous gasket having a leakproof joint.

Other objects and advantages of the invention will become apparent from the following description when taken in conjunction with the accompanying drawings and claims.

Figure 4:
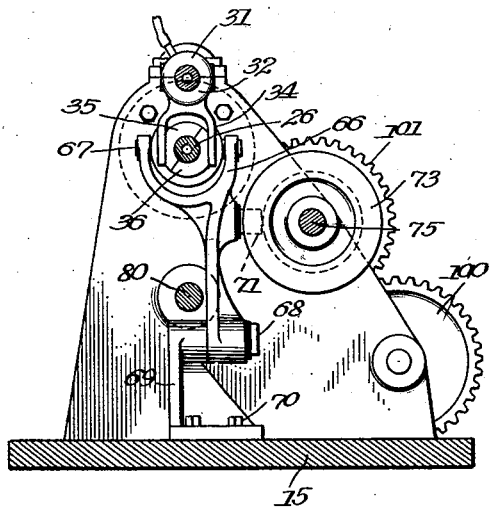
Figure 5:
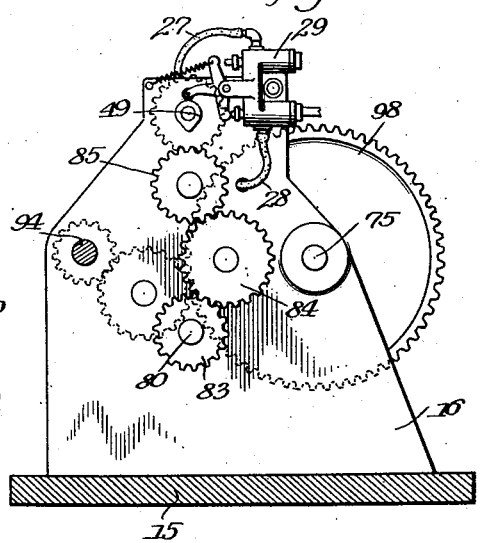

Referring to the drawings in which is shown a preferred embodiment of the invention:

Figure 1 is a plan view of my improved apparatus for forming and applying gaskets to caps, Figure 2 is a side view of Figure 1 with parts cut away, Figure 3 is a sectional view taken substantially along the line 3—3 of Figure 1, looking in the direction of the arrows, Figure 4 is a sectional view taken along the line 4—4, of Figure 1 looking in the direction of the arrows, Figure 5 is a sectional view taken substantially along the line 5—5, of Figure 1 looking in the direction of the arrows, Figure 6 is a sectional view taken substantially along the line 6—6 of Figure 9, Figure 7 is a view substantially similar to Figure 6 showing the position of the strand as it is wrapped around the mandrel, Figure 8 is a view substantially similar to Figure 6 showing the position of the parts when the gasket is applied to the cap, Figure 9 is a sectional view taken substantially along the line 9—9 of Figure 6, Figure 10 is a detail view of the vacuum valve casing and its associated parts, Figure 11 is a fragmentary detail of Figure 9 showing the position of the cutter relative to the formed gasket prior to the severing of the gasket from the remaining portion of the strand, Figure 12 is a fragmentary view showing the spirally wound strand preparatory to its being severed to form the gasket, and Figure 13 is a detailed perspective view of the severed gasket.

My improved machine for forming and applying plastic gasket material to jar caps and the like, includes a revoluble feeding member or roll 10 (Fig. 6), a coacting forming member or mandrel 11, a reciprocating plunger 12 and an index holder 13 operable to feed singly, a cap 14 between the plunger 12 and mandrel 11 at predetermined intervals during the operation of the machine so that a gasket formed on the mandrel may be axially removed from the mandrel and applied to the cap 14. A base 15 having spaced transversely disposed standards 16 and 17 acts as a support for the various parts of the machine.

*Gasket feeding and applying mechanism*

The strand of plastic material 18 may be of any suitable cross-section as it issues from a reel or extrusion head (not shown), so as to be presented by the feeder 10 to the mandrel 11 where it is formed into a gasket 19 of the desired size and shape, preparatory to being applied to the cap 14.

In order to provide simple, efficient and positive means for releasably maintaining the strand 18 against the surfaces of the feed roll 10 and the mandrel 11 at predetermined intervals during the operation of the machine, a pneumatic or vacuumized means is arranged to be operatively associated with the feeding and forming members to hold the strand against the surfaces of these members at fixed intervals and thus dispense with the use of complicated mechanical means for performing this function. As shown, the feed roll 10 is connected to a longitudinally disposed operating shaft 20 by the threaded bolts 21 and is provided with a radial port 22 which communicates with an axially disposed port or chamber 23 in the shaft 20. The mandrel 11 is likewise formed with a radial port 24 in communication with an axial port 25 in the drive shaft 26. The ports 23 and 25 communicate through the flexible members or connections 27 and 28 with a vacuum valve casing 29 so as to selectively control the suction produced at the outer surfaces of the feed roll 10 and mandrel 11. Any suitable means may be provided to insure the constant communication of the flexible members 27 and 28 with the ports in the shafts 20 and 26 and, as shown, this may be effected by a coupling 30 which is clamped to the shaft 20 by the sections 31 and 32 through the bolts 33 (Fig. 6). The lower section 32 has depending spaced arms 34 (Fig. 4) in engagement with complementary flat surfaces on the section members 35 and 36 which are suitably secured to the mandrel shaft 26 for the purpose which will subsequently be described. The members 35 and 36 are recessed to receive a bushing 37 which carries the spaced packing rings 38 and has an inwardly projecting portion 39 extending into a recess 40 in the outer surface of the shaft 26 to maintain the members 35 and 36 in fixed position thereon and prevent the releasing or diminishing of the vacuum from the coupling. The axial port 25 communicates with a series of radially spaced openings 41 which in turn communicate with the flexible member 28 to provide a constant communication of the flexible member with the port 25. The section 31 is similarly connected to the shaft 20 to communicate the flexible member 27 through radial openings with the port 23.

Positioned within the casing 29 (Fig. 10) are a pair of spaced alternately operable valves 42, the stems 43 and 44 of which, extend from one side of the casing and engage the opposite ends of a lever 45 pivotally connected as at 46 to the casing. An arm 47 projects laterally from the lever and carries a roller 48 which contacts with a cam 49 keyed to the feed roll shaft 20 so as to actuate the lever 45 against the tension of a spring 50 connected to the upper end of the lever and an arm 16′ which extends laterally from the standard 16. It will be seen that when the roller 48 is out of engagement with the raised portion of the cam 49, the stem 44 is moved to its outermost position to cut off communication of the pipe 27 with the vacuum valve casing 29. The opposite end of the lever 45, however, will then be brought into engagement with the stem 43 which opens its valve 42 to communicate the flexible member 28 with the conduit 51 which communicates with a vacuum pump or the like, not shown. Conversely, when the raised portion of the cam 49 engages the roller 48, the valve stem 43 will be moved outwardly by the action of the spring 52 to close communication of the vacuum with the member 28. Simultaneously with this movement, the valve stem 44 is moved inwardly, causing the opening of its valve and the communication of the member 27 through the passage 53 with the vacuum supply pipe 51. Thus, the rotation of the feed roll shaft 20 is utilized to control the release and application of the vacuum to the feeding and forming members at predetermined intervals during the operation of the machine. The casing 29 may be connected to the standard 16 by the bolt 54.

A sleeve 55 (Fig. 6) surrounds the mandrel 11 and normally is spaced inwardly from one end thereof to act as a guide or stop for the strand as the latter is initially fed to the mandrel from the feed roll 10. After the strand has been wrapped around the mandrel, the sleeve is operable to remove the preformed gasket and apply it to the cap. In order to provide a slight overlap at the ends of the strand so that when the preformed gasket 19 is applied to the jar or can top it will provide a leakproof joint, the mandrel 11 during its initial rotative movement is advanced longitudinally or axially relative to the sleeve 55 with the result that the strand is spirally wrapped around the mandrel during the rotation of the mandrel through one revolution. This axial movement is imparted to the mandrel by a yoke arm 56 connected to a collar 57 keyed to the shaft 26. The lower end of the arm 56 is pivoted to a bracket 58 as at 59 and is operable in the manner as will be subsequently described.

The standard 17 has connected thereto by the threaded bolts 60, a housing or bearing member 61 which supports the mandrel 11 and sleeve 55 (Fig. 6). The housing 61 also acts as a support for the bushing 62 through which revolubly extends the feed roll shaft 20. A fixed cutter 63 is secured as at 64 to the housing 61 and has a cutting edge 65 positioned to sever the preformed gasket from the remaining portion of the strand upon the axial movement of the sleeve 55 relative to the mandrel. This movement is imparted to the sleeve 55 by a yoke arm 66 connected as at 67 to the sleeve and pivoted at its lower end as at 68 to a bracket 69 secured to the base by the bolts 70 (Fig. 4).

The yoke arms 56 and 66 are each provided with a laterally extending roller 71 (Fig. 1) arranged to fit into a complementary cam groove 72 in the spaced cam members 73 and 74 keyed to the shaft 75. The pitch of the grooves in the cams 73 and 74 is such as to cause the selective reciprocation of the shaft 26 and the sleeve 55 at predetermined intervals during the operation of the machine so as to axially move the mandrel relative to the sleeve to spirally wrap the strand on the mandrel, and subsequently to move the sleeve relative to the mandrel to withdraw the preformed gasket and apply it to the cap in a single and continuous operation. The connection of the coupling 30 with the feed roll shaft 20 through the clamping sections 31 and 32, permits the free rotation of the shaft 20 in the coupling and the continuous supply of the vacuum from the flexible member 27 to the axial port 23. At the same time, the engagement of the depending arms 34 with the adjacent flat sides of the sections 35 and 36 prevents the rotation of these sections with the mandrel shaft 26 but permits the sections 35 and 36 as well as the flexible member 28 to be moved bodily and axially with the shaft 26 during the operation of the machine. The diameter of the feeding member 10 is slightly larger than that of the forming member 11 in order that a sufficient length of the strand 18 may be spirally wrapped around the forming member during each revolution of these members.

The shaft 75 carries a disc 76 (Fig. 3) having a laterally extending lug or pin 77 arranged to fit into spaced radial slots 78 in a Geneva wheel 79 keyed or otherwise secured to a shaft 80. The index holder 13 is secured to the shaft 80 and has a plurality of segmental pockets 81 of sufficient width to receive the caps 14 as these caps are sequentially fed to the index holder through the inclined chute 82, which discharges a cap edgewise into each pocket just before the pocket reaches its uppermost position. The number of slots 78 in the Geneva wheel correspond to the number of cap receiving pockets 81 so that upon each rotation of the shaft 80, a new cap will be moved into alignment with the mandrel 11 to receive a preformed gasket. The shaft 80 extends through the standards 16 and 17 and carries a gear 83 (Fig. 2) which through an idler 84, drives a gear 85 on the mandrel shaft 26.

The outer end of the mandrel 11 has a recess or socket 86 (Fig. 6) in which is slidably mounted an ejector 87 by the retaining pins 88. Coiled springs 89 normally urge the ejector to a position in advance or out of the socket 86 for withdrawing or returning the cap to its pocket after a gasket has been applied to the cap.

Driving mechanism

The various parts of the machine are so connected as to be operable in timed relation with respect to each other from a single source of power such as the motor 90 mounted on the base or bed 15. The motor shaft 91 has a pinion 92 in mesh with a gear 93 keyed to the shaft 94 carried by a bracket 95 and the standard 16. The opposite end of the shaft 94 has a gear 96 in mesh with an idler 97 which in turn drives a gear 98 on the shaft 75.

The shaft 75 is constantly rotated and makes one revolution for each revolution of the mandrel 11 and the feeder 10. A shaft 99 is connected through the gears 100 and 101 with the shaft 75 so as to be continuously operable by the latter. It will be seen that the actuation of the shaft 75 also operates the index holder 13 and the shaft 80 through the medium of the disc 76 and its operative connection with the Geneva wheel 79.

The feed roller shaft 20 has a gear 102 in mesh with a gear 103 on the shaft 26 to simultaneously rotate the feed roll 10 and the mandrel 11 in opposite directions. The connection of the Geneva wheel 79 through the shaft 80 and gears 83, 84 and 85 with the mandrel shaft 26 insures the rotation of the mandrel 11 through one revolution in response to the movement of the index holder being actuated to present a fresh cap in alignment with the mandrel. At the same time, the cam 49 on the feed roll shaft 20 is operated to control the supply of suction applied to the feeding and forming members through the valve casing 29. By virtue of this arrangement, intermittent movement of the parts is effected to cause a complete revolution of the feed roll 10 and the mandrel 11 during each advancing movement of the index holder 13, thus insuring the sequential feeding of the caps and the forming and applying of the gasket in a continuous and automatic operation. The gears 85 and 103 on the shaft 26 are of sufficient length or width to maintain this shaft during its axial movement in driving connection with the shafts 20 and 80 respectively.

The shaft 99 (Fig. 1) carries a groove cam 104 for receiving a roller or lug 105 on the lever 106 which in turn is pivoted as at 107 to a shaft 108 that extends through a standard 109 and has connected thereto the reciprocating plunger 12. An adjustable support 110 pivoted at 111 to the lever 106 is secured by the threaded nuts 112 to the standard 109 so as to vary the stroke of the plunger 12 in order to bring the cap 14 accurately in position during the operation of the machine. It will be seen that the shaft 99 through the cam 104 and lever 106 imparts a reciprocatory movement to the shaft 108 and the plunger 112 so as to actuate the plunger at predetermined intervals.

In order to maintain the strand of material in plastic condition it may be fed to the machine through an electrically heated guideway 113 (Fig. 3) while a firm adherence of the preformed gasket to the cap may be effected by providing the chute 82 with an electric heater 114 and the plunger 12 with a heating element 115.

Operation

The strand 18 of plastic gasket material such as raw rubber or the like, as it issues from the forming machine (not shown) is preferably of a rectangular shape so as to be of comparatively wide area and covers the radial port hole 22 of the feed roll 10, thus insuring the strand being firmly held against the surface of the roll when suction is applied thereto. The valve controlling the vacuum supply to the feed roll 10 and mandrel 11 are so timed that as the strand is advanced toward the feed roll, the end thereof will be held against the feed roll by the suction or negative pressure created in the port 22. Rotary movement is imparted to the feed roll 10 and mandrel 11 through the shaft 75, Geneva wheel 79, shaft 80 and the gears 83, 84 and 85 which connect the shaft 80 with the mandrel shaft 26. The shaft 20 is driven by the shaft 26 through the gears 102 and 103 so as to rotate simultaneously in an opposite direction. At the same time, rotative movement is imparted to the cams 73 and 74 on the shaft 75 which causes the timed actuation of the yoke arms 56 and 66 so that upon the initial rotation of mandrel 11, the shaft 26 and its supply member 28 will be advanced axially by the operation of the cam 74 to spirally wrap the strand around the mandrel and retain the end of the strand against the mandrel during its rotative movement. When the mandrel 11 makes one revolution, it is brought into engagement with the cap or disc 14 which in the meantime has been moved to the position as shown in Figure 7, by the actuation of the plunger 12 having been moved by the shaft 108 and its connection with the shaft 99 to present a cap 14 in axial alignment with the mandrel 11. The radial ports 22 and 24 in the feed roll 10 and mandrel 11 respectively, are so positioned relatively to each other that they will be substantially in vertical alignment when the end of the strand is carried by the feed roll 10 to engage the periphery of the mandrel 11. As the ducts 22 and 24 reach a point slightly beyond their vertically aligned positions, the vacuum valves 42 are operated through the lever 45 and cam 49 on the shaft 20 to release the vacuum in the port 22 and create a vacuum in the port 24, thus transferring the end of the strand from the feed roll 10 to the mandrel 11. The vacuum is retained in the port 24 until the strand is wrapped once around the mandrel whereupon the suction is released and applied to the surface of the feed roll 10. It will be apparent that the application and release of the vacuum on the surfaces of the feeding and forming members automatically takes place at timed intervals during the operation of the machine. Moreover, mandrel 11, during its rotative movement is also moved axially through the instrumentality of the cam 74 and the yoke arm 56 to spirally wrap the strand on the mandrel without affecting the supply of vacuum thereto. The pitch of the cam 74 is such that when the mandrel is brought into abutting engagement with the cap 14 the movement of the mandrel and its associated parts is temporarily stopped. Simultaneously, with the stopping of the mandrel, the sleeve 55 is actuated through the cam 73 and yoke lever 66 so as to axially withdraw the preformed gasket 19 from the mandrel and apply it to the cap 14.

When the end of the strand 19 is advanced by the feed roll 10 to engage the mandrel 11, the parts of the apparatus will be in the position as shown in Figure 6 with the strand between the end of the sleeve 55 and the cutter 63. As the mandrel continues to rotate, it is moved axially relative to the sleeve 55 by the cam 74 and the yoke arm 56 so as to cause the end portion of the strand to be spirally wrapped around the mandrel and assume the shape as shown in Figure 7. During this movement, the end of the strand is carried to the opposite side and out of the path of the cutter 63 while that portion of the strand adjacent the cutter is moved past or through the cutting edge 65 (Fig. 11) to sever the preformed gasket 19 from the remaining portion of the strand by an inclined or tapered cut 116 which extends longitudinally of the length of the strand. In the meantime, the rotative movement of the mandrel 11 and roll 10 have been arrested by the stopping of the Geneva wheel shaft 80 to which the mandrel is operatively connected through the train of gears 83, 84 and 85. Upon further advancing movement of the sleeve 55, the preformed gasket 19 is withdrawn from the mandrel and applied to the cap 14 so as to assume the position as shown in Figure 8. After the gasket 19 has been applied to the cap 14 the plunger 12 and the sleeve 55 are withdrawn and the finished cap is returned to its pocket 81 in the index holder 13 by the ejector 87 which, upon the initial axial movement of the mandrel, has been moved into its socket against the tension of the spring 89. Consequently, when the plunger 12 is withdrawn the spring 89 will cause the ejector 87 to be moved outwardly, thus returning the cap to its aligned pocket from where it is subsequently discharged upon the further rotation of the index holder.

As shown, the Geneva wheel 78 moves through an angle of 60° to position the succeeding cap carried by the index holder 13 in registration with the plunger 12 during each cycle of the operation of the machine. The shafts 20 and 26 together with their associated parts are returned to their normal positions by the cams 72 and 74 on the shaft 75 after each gasket is applied to its aligned cap and upon the cap being withdrawn from the holder 13, the latter is moved to present the next cap in registration with the plunger 12. At the end of each cycle of operation, the parts are in the position shown in Figure 9 so that upon the subsequent operation of the machine to form and apply a gasket to a cap, the holder 13 is moved in registration with the plunger 12, and at the same time, the shafts 20 and 26 carrying the feeder 10 and mandrel 11 respectively, are rotated through their connections with the Geneva wheel to feed and wrap the strand around the mandrel. The cam 49 on the shaft 20 is likewise rotated and as the ports 22 and 24 approach each other, the raised portion of the cam is brought into engagement with the roller 48 on the lever 45 whereupon the suction is released from the port 24 and applied to the port 22 so that the end of the strand 18 is carried by the member 10 into peripheral engagement with the mandrel 11 and when the ports 22 and 24 have passed slightly beyond their vertically aligned positions, the raised portion of the cam 49 moves out of engagement with the roller 48, with the result that the suction is transferred to the port 24 and released from the port 22. The end portion of the strand is held on the mandrel 11 until the ports 22 and 24 again assume the position as shown in Figure 9, whereupon the feeder 10 and mandrel 11 are temporarily stopped through their connection with the Geneva wheel 78 and the preformed gasket is severed by the cutter 63 and applied to the aligned cap by the axial movement of the sleeve 55, thus providing means for continuously forming and applying the gaskets singly to a cap during the operation of the machine. When the preformed gasket 19 is severed from the strand by the cutter 63 and applied to the cap, the remaining end portion of the flexible strand adjacent to the cutter is not appreciably moved by the sleeve, since it engages the side of the cutter, and is of sufficient width also to cover the opening 22, so that it is at all times properly positioned to be moved into engagement with the mandrel upon the application of suction to the rotary feeder 10.

As the strand is of plastic material, it is desirable to have it of rectangular shape at the time it is fed to the roll 10 and presented to the mandrel 11 so as to provide a comparatively wide area to insure it being firmly but releasably held against the surfaces of the feeding and forming members. However, when the preformed gasket is applied to the cap, it will be readily apparent that due to its plasticity, it can be quickly transformed by the application of pressure into a shape of comparatively wide surface and thin cross section so as to accommodate itself to the desired shape and completely fill the annular receiving groove in the cap 14 or other contiguous surface.

This action of the plastic gasket 19, to be easily distorted in accordance with the configuration desired, may be termed "molding" the gasket and insures the gasket being formed into a smooth flat exposed surface so as to constitute a tight and firm seal when the cap is applied to a jar or the like.

As will be observed from Figures 11, 12 and 13, the cutter 63 forms the opposed edges of the gasket with the inclined tapered surfaces 116 arranged to overlap and be united by the sleeve 55 when the latter presses the gasket against the cap 14, thus forming a continuous smooth flat gasket structure having a leakproof joint.

As the shafts 75 and 99 are continuously operated through the drive shaft 94, it will be seen that as soon as one gasket is applied to the cap, another cap is automatically moved into position so that the forming and applying operations continue uninterruptedly until the machine is stopped.

It will be understood that the form of the invention herewith shown and described is merely illustrative of a preferred embodiment, and that such changes may be made as fall within the purview of one skilled in the art without departing from the spirit of the invention and the scope of the appended claims.

What is claimed is:

1. A machine of the class described including a forming member, a feed member for advancing a strand of material to the forming member, means for rotating said members, each of said members having radial ports, vacuumized means communicating with said ports for applying suction to the surface of said members, means for controlling the vacuum to the members, means for moving the forming member axially to spirally wrap the strand thereon, and a coupling connecting the vacuum to said members whereby to permit the uninterrupted supply of the vacuum to the forming member during the axial movement thereof.

2. A machine of the class described including a forming member, a feed member for advancing a strand of material to the forming member, means for rotating said members, each of said members having radial ports, vacuum means communicating with said ports for applying a vacuum to the surface of said members, means for controlling the vacuum to the members, means for moving the forming member axially to spirally wrap the strand thereon, and a coupling connecting the vacuum to said members, said coupling including a movable portion for effecting a continuous supply of the vacuum to the forming member during the axial movement of the latter.

3. A machine of the class described including a mandrel, means for rotating the mandrel, means for feeding a strand of material to the mandrel, suction means associated with the surface of said mandrel to maintain the strand in engagement therewith, means for moving the mandrel axially to spirally wrap the strand thereon, and means for maintaining the suction at the surface of the mandrel during the axial movement of the latter.

4. A machine of the class described including a mandrel, means for feeding a strand of material to the mandrel, means for rotating the mandrel, means for producing a vacuum at the surface of the mandrel to maintain the strand in engagement therewith, means for moving the mandrel axially during its rotative movement to spirally wrap the strand thereon, and means for releasing the vacuum upon the completion of one revolution of the mandrel.

5. A machine of the class described including a forming mandrel, a feed device operable to present the end of a strand of plastic material to said mandrel, means for rotating the mandrel, suction means for holding the strand against the mandrel during the rotation of the latter, means for releasing the suction upon the completion of one revolution of the mandrel, and means for severing the preformed gasket formed on the mandrel from the remaining portion of the strand.

6. A machine of the class described including a rotatable mandrel, a sleeve surrounding said mandrel, means for applying a vacuum to the surface of said mandrel to secure the end of a strand of gasket material thereto, means for simultaneously imparting a combined rotary and axial movement to the mandrel to spirally wrap the strand thereon, means when the strand completes one revolution for releasing the vacuum, means for severing the preformed gasket from the remaining portion of the strand, and means for axially moving the sleeve relative to the mandrel to withdraw the preformed gasket.

7. A machine of the class described including a rotatable mandrel, a sleeve surrounding said mandrel, means for applying a vacuum to the surface of said mandrel to secure the end of a strand of gasket material thereto, means for simultaneously imparting a combined rotary and axial movement to the mandrel to spirally wrap the strand thereon, means for effecting a continuous application of the vacuum to the mandrel during the axial movement of the latter, means when the strand completes one revolution for releasing the vacuum, means for severing the preformed gasket from the remaining portion of the strand and means for axially moving the sleeve relative to the mandrel to withdraw the preformed gasket.

8. A gasket forming and applying machine of the class described including a rotatable forming member, a feed member for advancing a strand of material to the forming member, suction means associated with the forming member to hold the strand in engagement therewith, means for moving the forming member axially during its rotative movement to wrap spirally the strand thereon, means for severing the preformed gasket from the remaining portion of the strand, means to release the suction applied to the forming member, a cap holding means in substantial alignment with the forming member, and means for withdrawing the preformed gasket from the forming member when the suction is released and for applying the gasket to a cap carried by said holding means.

9. A gasket forming and applying machine of the class described including a rotatable forming member, a feed member for advancing a strand of material to the forming member, suction means operatively connected to one of said members and associated with the forming member to hold the strand in engagement therewith, means for moving the forming member axially during its rotative movement to wrap spirally the strand thereon, means for releasing the suction applied to the forming member upon the completion of one revolution thereof, means for severing the preformed gasket from the remaining portion of the strand, a cap holding means in substantial alignment with the forming member, and means for withdrawing the preformed gasket from the forming member and for applying it to a cap carried by said holding means.

10. A machine of the class described including a rotatable mandrel, a sleeve surrounding said mandrel, means for applying a vacuum to the surface of said mandrel to secure the end of a strand of gasket material thereto, means for simultaneously imparting a combined rotary and axial movement to the mandrel to spirally wrap the strand thereon, means when the strand completes one revolution for releasing the vacuum, means for severing the preformed gasket from the remaining portion of the strand, a cap holding means substantially in alignment with the mandrel, and means for axially moving the sleeve relative to the mandrel to withdraw the preformed gasket and apply it to a cap carried by said holding means.

11. A machine of the class described including a forming member, a feeding member for advancing a strand of material to the forming member, each of said members having a port communicating with its outer surface, means for rotating said members, means for applying suction to the outer surface of said members through said ports, and control means associated with each of said ports for alternately releasing and applying suction at the outer surfaces of said members at predetermined intervals during the operation of the machine so that the leading end portion of the strand is initially secured to the feeding member by the suction applied to its outer surface, the suction being automatically released from the feeding member and applied to the forming member by the control means upon the leading end portion being presented to the forming member to secure the strand to the latter.

12. A machine of the class described including a forming member, a feeding member for advancing a strand of material to the forming member, each of said members having a port communicating with its outer surface, means for rotating said members, means for applying suction to the outer surfaces of said members through said ports, and control means operatively connected to one of said members and common to each of said ports for alternately releasing and applying suction at the outer surface of said members at predetermined intervals during the operation of the machine so that the leading end portion of the strand is initially secured to the feeding member by the suction applied to its outer surface, the suction being automatically released from the feeding member and applied to the forming member by the control means upon the leading end portion being presented to the forming member to secure the strand to the latter.

13. A machine of the class described including a forming member, a feeding member for advancing a strand of material to the forming member, each of said members having a port communicating with its outer surface, means for rotating said members, means for applying suction to the outer surfaces of said members through said ports, and control means operatively connected to the feeding member and common to each of said ports for alternately releasing and applying suction at the outer surface of said members at predetermined intervals during the operation of the machine so that the leading end portion of the strand is initially secured to the feeding member by the suction applied to its outer surface, the suction being automatically released from the feeding member and applied to the forming member by the control means upon the leading end portion being presented to the forming member to secure the strand to the latter.

14. A machine of the class described including a forming member, a feeding member for advancing a strand of material to the forming member, each of said members having a port communicating with its outer surface, means for rotating said members, means for applying suction to the outer surface of said members through said ports, and control means common to each of said ports for alternately releasing and applying suction at the outer surfaces of said members at predetermined intervals during the operation of the machine so that the leading end portion of the strand is initially secured to the feeding member by the suction applied to its outer surface, the suction being automatically released from the feeding member and applied to the forming member by the control means upon the leading end portion being presented to the forming member to secure the strand to the latter, said control means releasing the suction applied at the outer surface of the forming member upon the completion of one revolution thereof.

15. A machine of the class described including a forming member, a feeding member for advancing a strand of material to the forming member, each of said members having a port communicating with its outer surface, means for rotating said members, means for applying suction to the outer surface of said members through said ports, valve means for alternately releasing and applying suction at the outer surfaces of said members at predetermined intervals during the operation of the machine, and means for operating the valve means whereby the leading end portion of the strand is initially secured to the feeding member by the suction applied to its outer surface, the suction being automatically released from the feeding member and applied to the forming member by the valve means upon the leading end portion being presented to the forming member to secure the strand thereto.

16. A machine of the class described including a forming member, a feeding member for advancing a strand of material to the forming member, each of said members having a port communicating with its outer surface, means for rotating said members, means for applying suction to the outer surfaces of said members through said ports, valve means for alternately releasing and applying suction at the outer surface of said members at predetermined intervals during the operation of the machine, and means for operating the valve means so that the leading end portion of the strand is initially secured to the feeding member by the suction applied to its outer surface, the suction being automatically released from the feeding member and applied to the forming member by the valve means upon the leading end portion being presented to the forming member to secure the strand thereto, said valve means releasing the suction applied to the outer surface of the forming member upon the completion of one revolution thereof.

17. A machine of the class described including a forming member, a feeding member for advancing a strand of material to the forming member, each of said members having a port communicating with its outer surface, means for rotating said members, means for applying suction to the outer surfaces of said members through said ports, control means common to each of said ports for alternately releasing and applying suction at the outer surface of said members at predetermined intervals during the operation of the machine so that the leading end portion of the strand is initially secured to the feeding member by the suction applied to its outer surface, the suction being automatically released from the feeding member and applied to the forming member by the control means upon the leading end portion being presented to the forming member to secure the strand to the latter and means for moving the forming member axially to wrap spirally the strand thereon.

GEORGE GOEBEL.